United States Patent
Horimoto et al.

(10) Patent No.: US 7,926,517 B2
(45) Date of Patent: Apr. 19, 2011

(54) CYLINDRICAL JACKET, JACKET HOSE, SUCTION HOSE, AND CYLINDRICAL JACKET MANUFACTURING APPARATUS

(75) Inventors: Akira Horimoto, Nasu-gun (JP); Kenzou Toshiro, Otawara (JP); Kaori Kato, Nasu-gun (JP)

(73) Assignee: Sakura Rubber Co., Ltd., Tokyo (JP)

( * ) Notice: Subject to any disclaimer, the term of this patent is extended or adjusted under 35 U.S.C. 154(b) by 382 days.

(21) Appl. No.: 11/391,342

(22) Filed: Mar. 29, 2006

(65) Prior Publication Data

US 2006/0162954 A1   Jul. 27, 2006

Related U.S. Application Data

(63) Continuation of application No. PCT/JP2004/014384, filed on Sep. 30, 2004.

(30) Foreign Application Priority Data

Sep. 30, 2003 (JP) ................... 2003-341962

(51) Int. Cl.
*F16L 11/00* (2006.01)
(52) U.S. Cl. ......... 138/125; 138/123; 138/124; 138/129
(58) Field of Classification Search .................. 138/123, 138/124, 125, 129
See application file for complete search history.

(56) References Cited

U.S. PATENT DOCUMENTS

| | | | | |
|---|---|---|---|---|
| 1,606,810 A | * | 11/1926 | Saylor | 57/234 |
| 1,775,334 A | * | 9/1930 | Wanamaker | 138/125 |
| 1,931,868 A | * | 10/1933 | Kennedy | 427/370 |
| 1,972,523 A | * | 9/1934 | Kennedy | 138/125 |
| 2,230,723 A | * | 2/1941 | Maclachlan | 66/193 |
| 2,754,848 A | * | 7/1956 | Knowland et al. | 138/125 |
| 3,289,703 A | * | 12/1966 | Brown | 138/125 |
| 3,881,522 A | * | 5/1975 | Lewis et al. | 138/144 |
| 4,135,025 A | * | 1/1979 | Backes | 428/195.1 |
| 4,308,896 A | * | 1/1982 | Davis | 138/126 |
| 4,653,216 A | * | 3/1987 | Inoue | 43/18.5 |
| 4,850,395 A | * | 7/1989 | Briggs | 138/30 |
| 4,877,665 A | * | 10/1989 | Higuchi et al. | 428/36.1 |
| 5,127,919 A | * | 7/1992 | Ibrahim et al. | 623/1.51 |
| 5,843,542 A | * | 12/1998 | Brushafer et al. | 428/36.1 |
| 6,360,780 B1 | * | 3/2002 | Adolphs et al. | 138/98 |
| 6,508,276 B2 | * | 1/2003 | Radlinger et al. | 138/125 |
| 2004/0138644 A1 | * | 7/2004 | DiCarlo et al. | 604/524 |

FOREIGN PATENT DOCUMENTS

| | | |
|---|---|---|
| JP | 7-4569 | 1/1995 |
| JP | 7-500882 | 1/1995 |
| JP | 11-117146 | 4/1999 |
| JP | 2000-55247 | 2/2000 |
| JP | 2002-310341 | 10/2002 |
| JP | 2002-340240 | 11/2002 |

OTHER PUBLICATIONS

International Search Report of PCT/JP2004/014384, mailed Jan. 18, 2004.

\* cited by examiner

*Primary Examiner* — James F Hook
(74) *Attorney, Agent, or Firm* — Nixon & Vanderhye P.C.

(57) ABSTRACT

In a cylindrical jacket woven into twill A, the direction of a twill line A formed by a warp 2 woven continuously over a weft 3 is substantially aligned with the direction of the central axis of the cylindrical jacket.

6 Claims, 8 Drawing Sheets

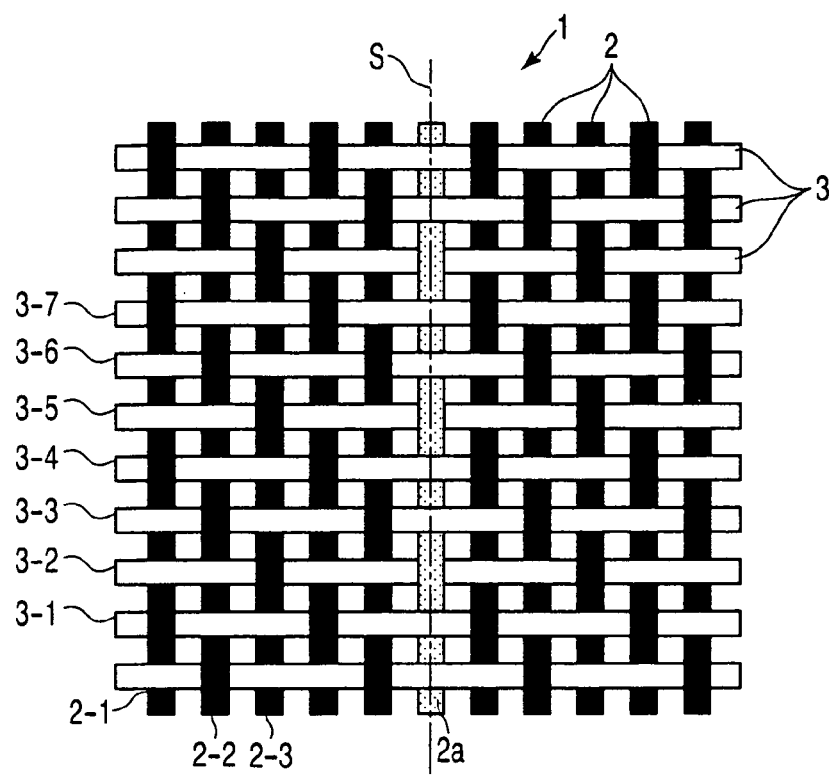
F I G. 2A
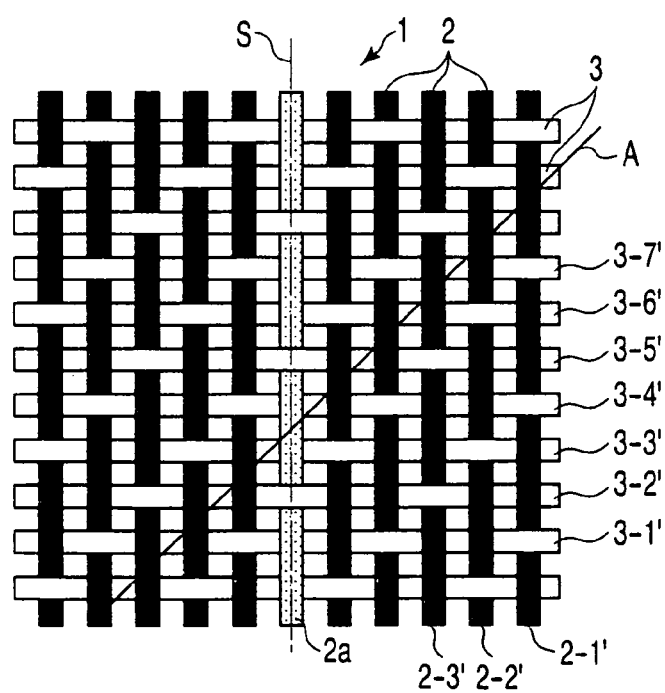
F I G. 2B

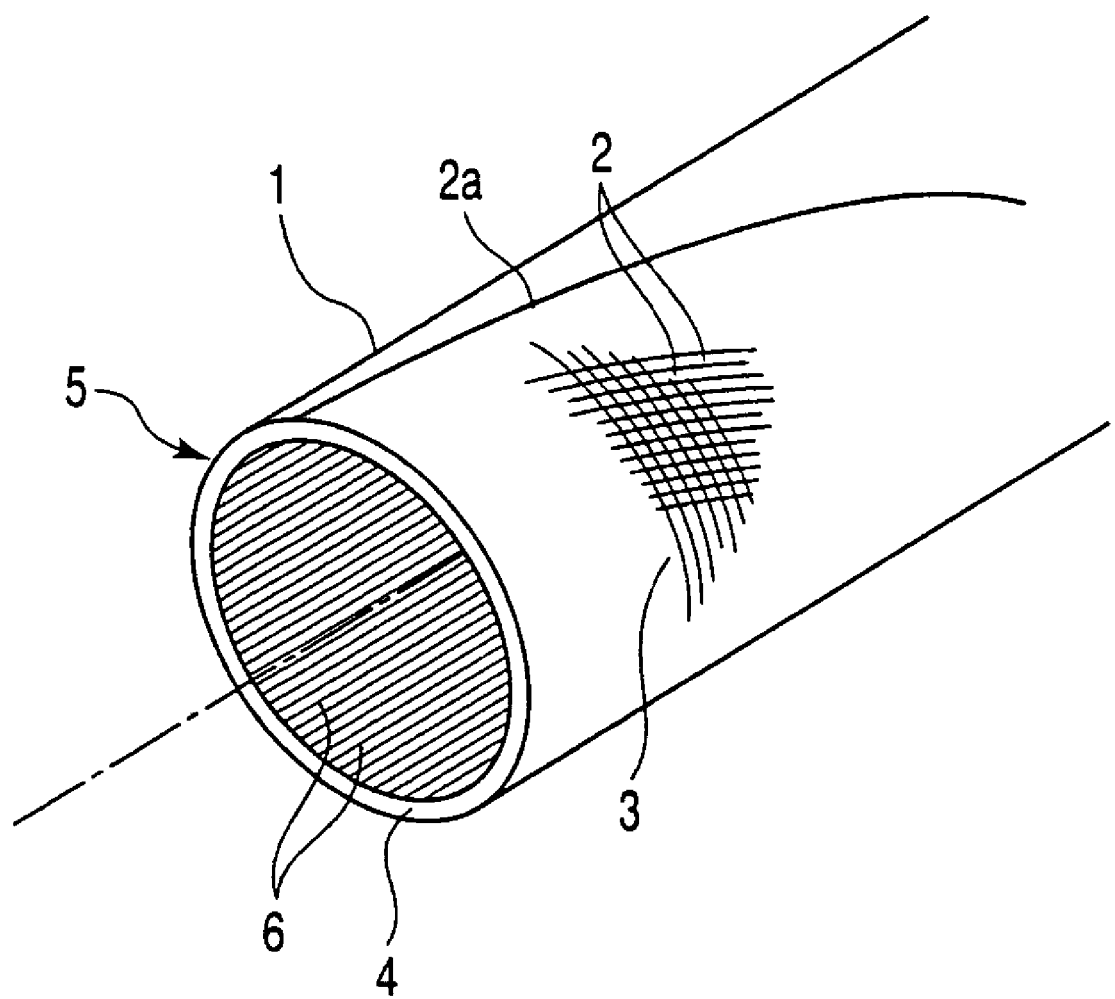
F I G. 5

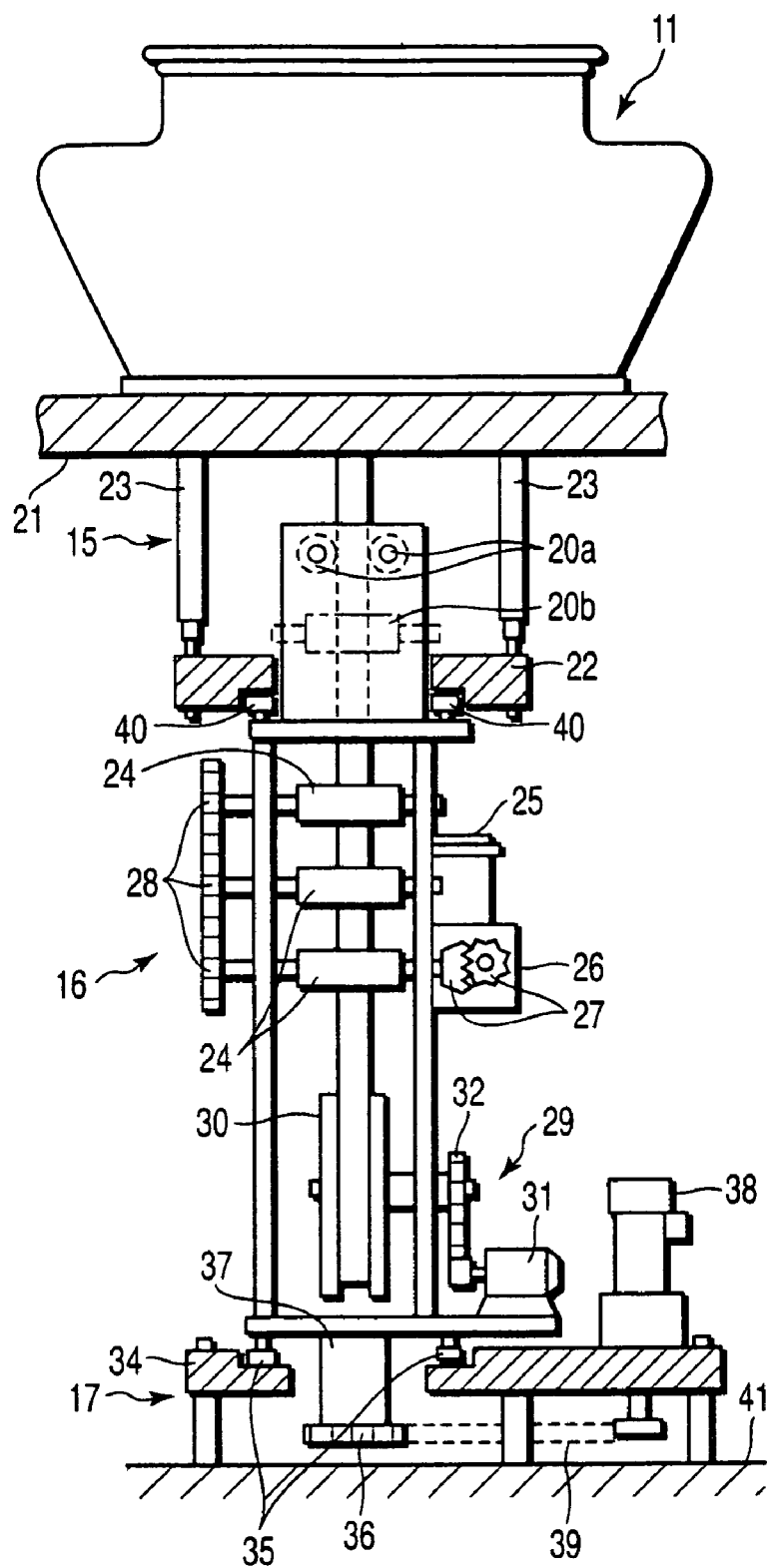
F I G. 6

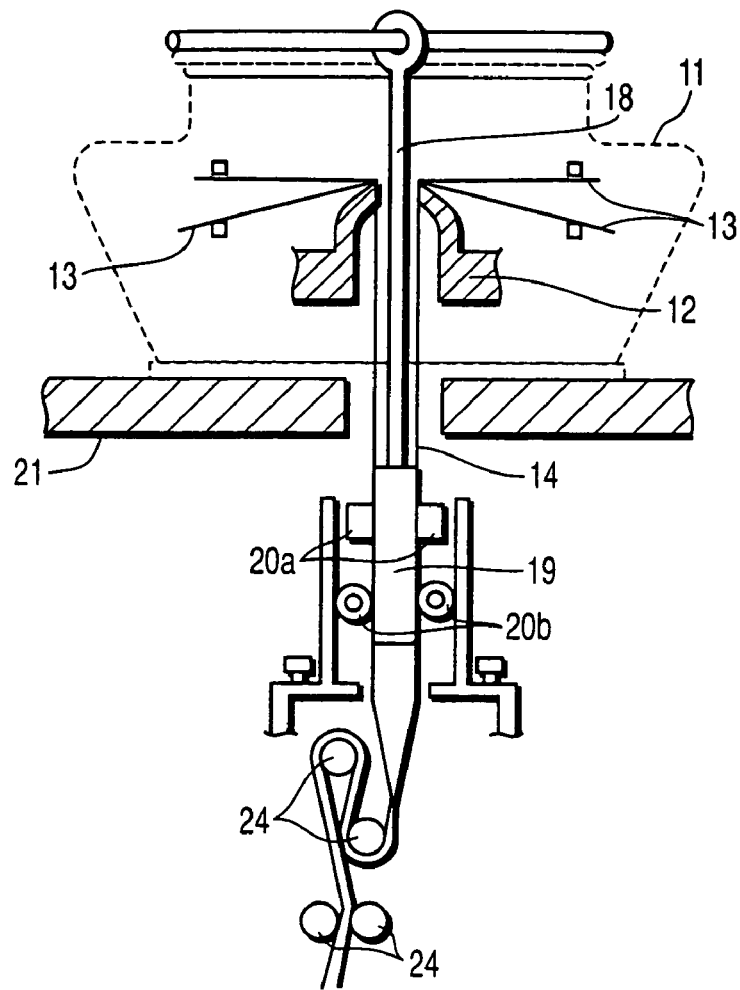
F I G. 8
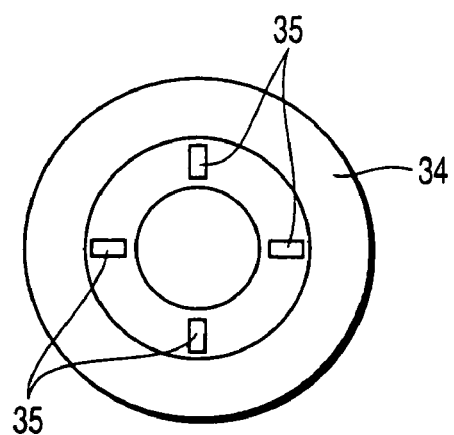
F I G. 9

CYLINDRICAL JACKET, JACKET HOSE, SUCTION HOSE, AND CYLINDRICAL JACKET MANUFACTURING APPARATUS

CROSS-REFERENCE TO RELATED APPLICATIONS

This is a Continuation Application of PCT Application No. PCT/JP2004/014384, filed Sep. 30, 2004, which was published under PCT Article 21(2) in Japanese.

This application is based upon and claims the benefit of priority from prior Japanese Patent Application No. 2003-341962, filed Sep. 30, 2003, the entire contents of which are incorporated herein by reference.

BACKGROUND OF THE INVENTION

1. Field of the Invention

The present invention relates to a cylindrical jacket, such as a fire hose, a shape-keep hose, a water absorption hose and an oil supply hose, a jacket hose, and a suction hose, and an apparatus for manufacturing the cylindrical jacket.

2. Description of the Related Art

A fire hose is generally made liquid-tight by forming a lining layer made of rubber or synthetic resin on the inside surface of a cylindrical jacket. Namely, a jacket is formed by weaving warp and weft fibers in a cylindrical form by a cylindrical weaving machine, and forming a lining layer on the inside surface of the jacket.

A fire hose is strongly demanded to be flexible and lightweight, and the lining layer tends to become thin. However, if the lining layer is made thin, the texture (crossing) formed by the warp and weft becomes uneven on the inside surface of a jacket, and the uneven texture causes unevenness in the lining layer. This uneven lining layer causes resistance to the flow of water. Particularly, the resistance is increased by a projected rim generated by the weft in the circumferential direction (spiral direction) just like bellows.

In a conventional hose, a lining layer is provided on the inside surface of a cylindrical jacket, and projected rims are provided in the lining layer along the hose length direction (Patent Document 1, for example).

In another example of conventional hose, a lining layer is provided on the inside surface of a cylindrical jacket, and grooves are provided inside the lining layer along the hose length direction (Patent Document 2, for example).

In either example, generation of turbulence on the inside surface of a hose is controlled, a pressure loss is minimized, and a water flow speed is increased.

However, the thickness of a lining layer of a fire hose is approximately 0.5 mm in order to ensure flexibility and lightweight. If the lining layer thickness is increased by providing projected rims, the flexibility and lightweight cannot be ensured. Therefore, the height of projected rims must be set low. Further, when forming a groove in the lining layer, the groove depth is not deep as long as it formed in a lining layer of approximately 0.5 mm.

Therefore, even if a projected rim or a groove is formed in the lining layer along the central axis of a hose, it is insufficient to control the turbulence because a large unevenness like a bellows is generated by a weft. If the projected rim is made high or the groove is made deep by forming a thick lining layer, the flexibility and lightweight of a hose cannot be ensured. Further, if the lining layer is given additional processing, the cost is increased.

Patent Document 1: Jpn. Pat. Appln. KOKAI Publication No. 7-4569 (claims and FIG. 1)

Patent Document 2: Jpn. Pat. Appln. KOKAI Publication No. 2000-55247 (claims and FIG. 1)

BRIEF SUMMARY OF THE INVENTION

The present invention has been made under the above circumstances. Accordingly, it is an object of the present invention to provide a cylindrical jacket, jacket hose and a suction hose, which can be flexible and lightweight with a small pressure loss without giving additional processing to a lining layer, and a cylindrical jacket manufacturing apparatus.

To achieve the above object, there is provided:

(1) a cylindrical jacket woven into twill in which the direction of a twill line formed by a warp woven continuously over a weft is substantially aligned with the direction of the central axis of the cylindrical jacket.

(2) A cylindrical jacket woven into twill in which the direction of a twill line formed by a warp woven continuously over a weft is arranged spirally at an angle of less than 10° to the direction of the central axis of the cylindrical jacket.

(3) The cylindrical jacket according to 1 or 2, wherein a twill line generated in the direction oblique to the central axis of the cylindrical jacket is arranged linearly along the central axis of the cylindrical jacket, or spirally at an angle of less than 10° to the central axis, by arranging the warp spirally to the central axis of the cylindrical jacket.

(4) The cylindrical jacket according to 1 or 2, wherein a twill line formed by the warp woven continuously over the weft is arranged inside the cylindrical jacket.

(5) The cylindrical jacket according to any one of 1-4, wherein the warp is a fiber, and the weft is a fiber, a linear metallic material, a linear synthetic resin, or combination of these materials.

(6) A jacket hose which is formed by providing a lining layer on the inside surface of the cylindrical jacket according to any one of 1-5, wherein when a using pressure is applied to the hose, the direction of twill line is substantially aligned with the central axis of the hose, or forms an angle of less than 10° to the hose.

(7) A suction hose which is formed by providing a lining layer at least on the inside surface of the cylindrical jacket according to any one of 1-5, wherein when a negative pressure is applied to the hose when using, the direction of twill line is substantially aligned with the central axis of the hose, or forms an angle of less than 10° to the hose.

(8) An apparatus which manufactures a cylindrical jacket woven into twill consisting of a warp and a weft, comprising a rotary take-in unit which is provided in the lower part of a cylindrical weaving machine having a shuttle for weaving a weft as one component, and take in a cylindrical jacket woven by the cylindrical weaving machine; and a rotating mechanism which rotates the rotary take-in unit, wherein the rotary take-in unit is rotated in synchronization with a rotation speed of the shuttle at an optional ratio, and the cylindrical jacket is woven while being twisted.

(9) The cylindrical jacket manufacturing apparatus according to 8, wherein the rotary take-in unit has take-in rollers which feed the cylindrical jacket from a cylindrical weaving machine to a predetermined position, and a driving source which drives the take-in rollers, and a transmitting mechanism which transmits the driving force of the driving source to the take-in rollers.

(10) The cylindrical jacket manufacturing apparatus according to 9, wherein the rotary take-in unit has a take-up unit which takes up the cylindrical jacket from the unit, and the rotary take-in unit and take-up unit are rotated as one body by the rotating mechanism.

(11) The cylindrical jacket manufacturing apparatus according to 10, wherein the take-up unit has a take-up reel which takes up a cylindrical jacket, a driving source which drives the take-up reel, and a transmitting mechanism which transmits the driving force of the driving source to the take-up reel.

(12) The cylindrical jacket manufacturing apparatus according to 10, wherein the rotating mechanism has a rotating roller provided between the upper portion of the rotary take-in unit and an upper fixing guide, a support shaft which is connected to the lower central part of the rotary take-in unit along the axial direction of the unit, and has a transmitting tool at the end portion, a driving source which drives the rotary take-in unit, and a transmitting mechanism which transmits the driving force from the driving source to the transmitting tool.

(13) The cylindrical jacket manufacturing apparatus according to 8, further comprising a cylinder twisting mechanism which twists the cylindrical jacket taken in from the cylindrical weaving machine in a cylindrical form, between the cylindrical weaving machine and the rotary take-in unit.

(14) The cylindrical jacket manufacturing apparatus according to 13, wherein the cylinder twisting mechanism has a cylinder holding mandrel which is supported to be located inside the cylindrical jacket from the cylindrical weaving machine, and one or more pairs of cylinder twisting rollers which holds the cylinder holding mandrel from the outside of the jacket.

In a cylindrical jacket woven into twill according to the present invention, a warp becomes spiral to a cylindrical jacket by substantially aligning the direction of a twill line with the direction of a central axis of a cylindrical jacket by giving a twist around the central axis, for example. As a means for substantially aligning the direction of a twill line with the direction of the central axis of a cylindrical jacket by giving a twist around the central axis, a twist may be given by holding both ends of the longish side of the cylindrical jacket.

If a weft is a hard steel wire, the direction of twill line may be aligned with the central line of a cylindrical jacket by twisting the cylindrical jacket by the elastic force of returning to an original linear state of the steel wire weft formed like a small coil spring, when weaving with a warp.

According to the cylindrical jacket of the present invention, by arranging a twill line formed by a warp woven continuously over a weft inside the cylindrical jacket, a large projected rim is formed axially by the twill line, which can match a large peripheral unevenness generated like bellows by a weft. Therefore, the cylindrical jacket can be made flexible and lightweight with a small pressure loss without additionally processing a lining layer.

According to the cylindrical jacket of the present invention, as described in the above 2, by arranging a twill line formed by a warp woven continuously over a weft spirally at an angle of less than 10° to the central axis of the cylindrical jacket, a pressure loss in a meandering hose including a curved portion can be decreased when the cylindrical jacket is used as a hose, because a little spiraled vertical stripe exists inside the cylindrical jacket. The spiral is formed so that the angle between the twill line and the central line of the cylindrical jacket becomes less than 10°, preferably 3-7°.

According to a cylindrical jacket manufacturing apparatus of the present invention, weaving is possible while twisting a warp of a cylindrical jacket by a rotating mechanism by rotating a rotary take-in unit in synchronization with the rotation of a shuttle at an optional ratio. Therefore, a cylindrical jacket can be manufactured with a warp twisted, not straight. Particularly, as described in 13, above, a cylinder twisting mechanism having a cylinder twisting roller is provided between a ceiling and a rotary take-in unit, and a cylindrical jacket is not wrinkled even if a large twist is given, and an uniformly twisted cylindrical jacket can be obtained.

BRIEF DESCRIPTION OF THE SEVERAL VIEWS OF THE DRAWING

FIG. 2A shows the outside texture of the cylindrical jacket of the first embodiment;

FIG. 2B shows the inside texture of the cylindrical jacket of the first embodiment;

FIG. 5 is a perspective view of a jacket hose according to the same embodiment;

FIG. 6 is a front view of a cylindrical jacket manufacturing apparatus according to a second embodiment of the present invention;

FIG. 8 is a schematic diagram of the right side of the cylindrical jacket manufacturing apparatus; and FIG. 9 is a plane view of a lower part fixing guide and a rotating roller, one of the components of the manufacturing apparatus.

DETAILED DESCRIPTION OF THE INVENTION

Hereinafter, embodiments of the present invention will be explained based on the accompanying drawings.

Embodiment 1

Figure 1:
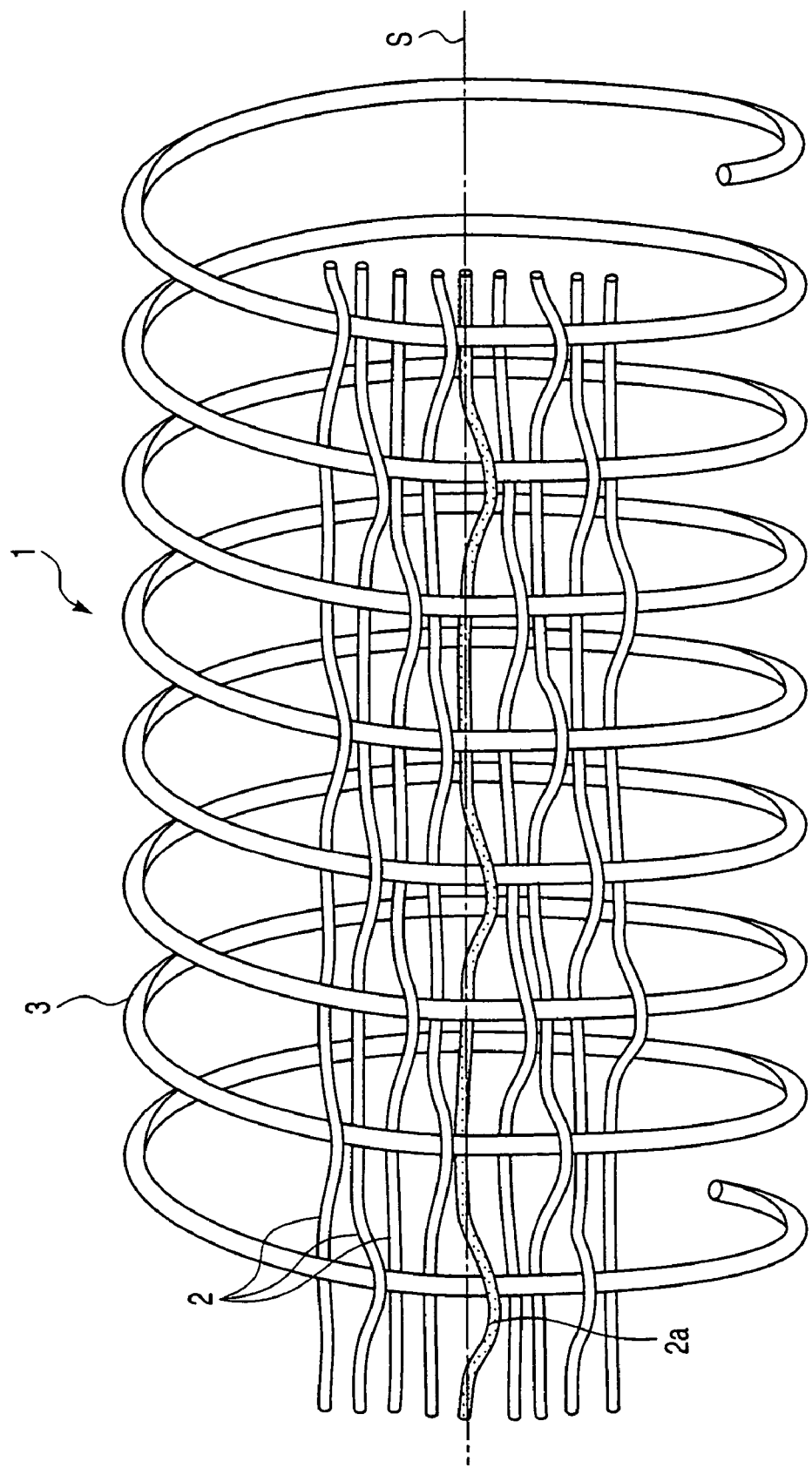
FIG. 1 is an explanatory drawing of a cylindrical jacket according to a first embodiment of the present invention.
Figure 3:
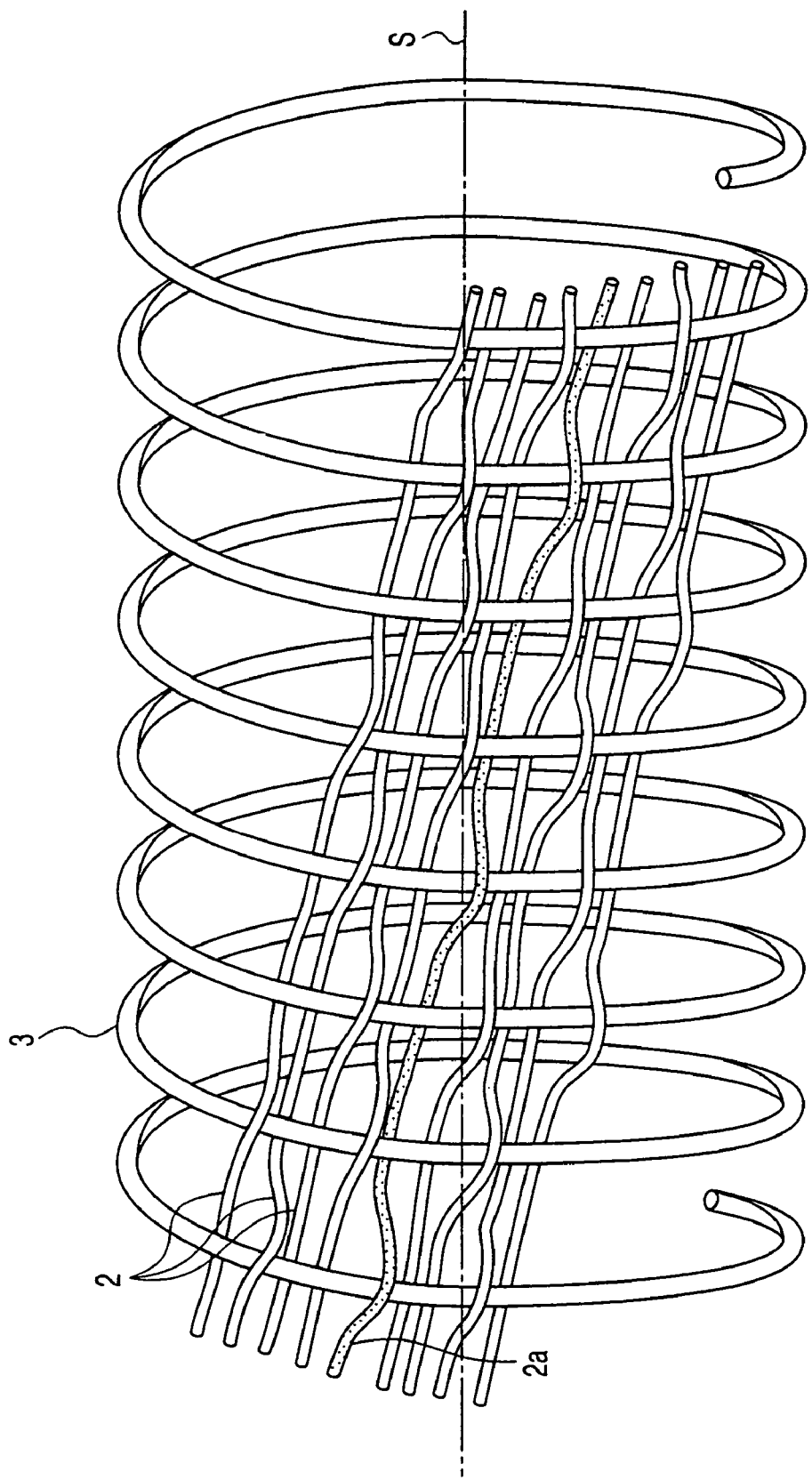
FIG. 3 is an explanatory drawing of the cylindrical jacket of the first embodiment, in the state given a twist.

A configuration of a cylindrical jacket 1 will be explained based on FIGS. 1-4. The jacket is composed of a plurality of warp 2 made of fiber and one weft 3 made of hard steel wire. The warp 2 uses 298 white polyester threads spun into 10/10s and one blue shank thread 2a spun into 20/10s, for example. The weft 3 uses 1.8-mm-diameter galvanized hard steel, for example, and is driven to have 26 knots per 10 cm. One shank thread 2a out of the warps 2 used here is simply shown to clearly indicate the direction of the warp 2 and the direction of a twill line A formed by the warp 2 woven continuously over the weft 3 when the warp 2 and weft 3 are woven into twill, and is not directly concerned with the present invention. FIGS. 1-3 show the structures of a fabric woven by a one-shuttle cylindrical weaving machine and arranged in one line.

The cylindrical jacket 1 is remodeled to one-shuttle from the cylindrical weaving machine HM604 made by Mandal in Norway. A plurality of warp 2 to be woven is inserted into shuttle guide pins (not shown) arranged cylindrically just like surrounding the cylindrical jacket 1. One weft 3 to be woven with the warps 2 is supported by a shuttle (not shown) whose front end revolving along the direction of arranging the shuttle guide pins. The shuttle is passed between the warps 2 parted into upper and lower parts by the peak and valley of a shading wheel (not shown), and the cylindrical jacket 1 is continuously woven while weaving the weft 3 spirally. The ordinary not-remodeled cylindrical weaving machine HM604 has two shuttles, and the weft 3 is arranged in two lines. A cylindrical weaving machine with three or more shuttles may be used. Sack-like twill woven by using a plain weaving machine is allowed.

The cylindrical jacket 1 woven by the above-mentioned cylindrical weaving machine is a ½ twilled cloth. FIG. 1 and FIG. 2 show a cylindrical jacket 1 comprising a ½ twilled cloth. FIG. 2A shows the outside of the jacket (the front side of cloth). FIG. 2B shows the inside of the jacket (the back side of cloth). The jacket is woven with the warps 2 and weft 3. One of the warps 2 is a shank thread 2a. When viewed from the outside of the jacket, as shown in FIG. 2A, the warp 2-1 rides over one weft 3-1, sinks under two wefts 3-2/3-3 and appears inside, and then rides over one weft 3-4, and then sinks under two wefts 3-5/3-6. This is repeated.

The adjacent warp 2-2 sinks under two wefts 3-1/3-2, rides over one weft 3-3, and then sinks under two wefts 3-4/3-5, and rides over one weft 3-6. This is also repeated. The next warp 2-3 rides over one weft 3-2, sinks under two wefts 3-3/3-4, and then rides over one weft 3-5, and sinks under two wefts 3-6/3-7. This is repeated.

When the jacket is viewed from the inside, it appears as a back of cloth or textile as shown in FIG. 2B. The reference numeral 2-1' in FIG. 2B and 2-1 in FIG. 2A denote the same warp. Similarly, the numerals 2-2 and 2-2', and 2-3 and 2-3' are the same warp. The numerals 3-1 and 3-1', 3-2 and 3-2', and 3-3 and 3-3' are the same wefts.

As described above, in the cylindrical jacket 1 woven into a ½ twilled cloth, the direction of a twill line A formed by the warp 2 woven continuously over the weft 3 becomes substantially 45° to the central axis S of the cylindrical jacket 1, and the shank yarn 2a, as a warp becomes parallel to the central axis S of the cylindrical jacket 1, as shown in FIG. 2B. When the thickness and density of the warp and weft are the same, the angle of the direction of the twill line A to the central axis S of the cylindrical jacket becomes exactly 45°. The cylindrical jacket woven into a ½ twilled cloth is merely one example. The jacket may be ⅓ twilled, steeply twilled or gently twilled cloth, or may be fancy and figured twill such as checkerboard twill, as long as it is a twilled cloth.

Figure 4A:
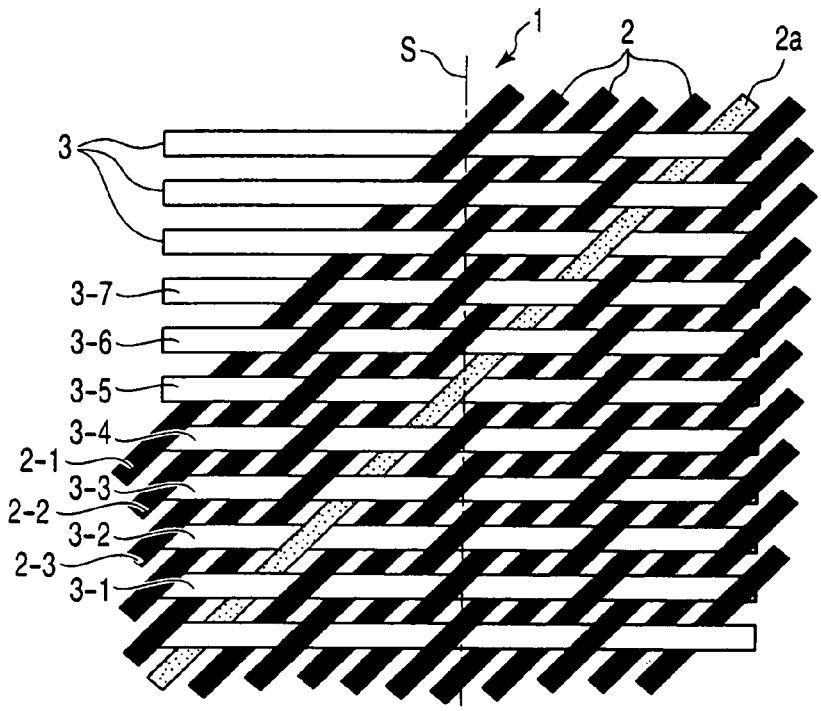
FIG. 4A shows the outside texture of the cylindrical jacket of the first embodiment, in the state given a twist.
Figure 4B:
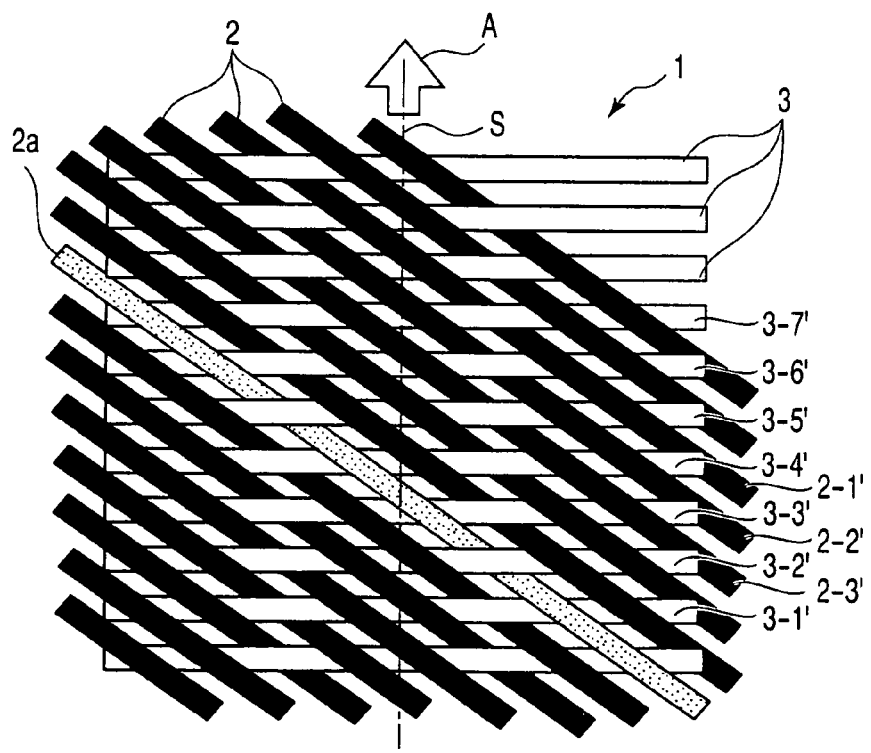
FIG. 4B shows the inside texture of the cylindrical jacket of the first embodiment, in the state given a twist.

When a twist is given around the center of the cylindrical jacket 1 woven into a ½ twilled cloth and the direction of the twill line A is substantially aligned with the central axis S of the cylindrical jacket 1, as shown in FIG. 3, FIG. 4A and FIG. 4B, all warps 2 including the shank thread 2a become spiral to the central axis S of the cylindrical jacket 1. As a means for aligning the direction of the twill line A substantially with the central axis S of the cylindrical jacket 1 woven into a ½ twilled cloth by giving a twist around the central axis S, a twist may be given by holding both ends of the longish side of the cylindrical jacket 1, or the cylindrical jacket 1 may be twisted by the elastic force of returning to an original linear state of the galvanized steel line weft 3 formed like a small coil spring, so that the direction of the twill line A is aligned with the central axis S of the cylindrical jacket 1.

Now, the cylindrical jacket 1 will be concretely explained. The jacket is woven by reducing about 30% toward the central axis S so that the weft 3 is driven to 36 knots per 10 cm from 26 knots per 10 cm. Then, the cylindrical jacket is twisted about 500°/m rightward. The central axis S of the cylindrical jacket 1 is aligned with the twill line A, and the twill line A becomes linear over the axial direction of the cylindrical jacket 1. As described above, if a galvanized hard steel wire of the weft 3 is formed like a coil spring and configured to be automatically reduce by 30% in the axial direction and twisted about 500°/m, the cylindrical jacket 1 with the direction of the twill line A aligned with the central axis S of the jacket can be manufactured without giving a twisting force.

The galvanized hard steel wire of the weft is shown as an example. It may be a fiber, a linear metallic material or linear synthetic resin, or combination of them. The weft 3 is not limited to one. Two wefts may be arranged like a 2-thread screw. Three or four wefts may be used.

Next, a method of manufacturing a jacket hose will be explained. As shown in FIG. 5, lead a lining tube into the cylindrical jacket 1 woven into a ½ twilled cloth and swell it by air pressure, and give a twist around the central axis S, and align the direction of the twill line A with the central axis S of the cylindrical jacket 1. Then, while giving a twist around the central axis S of the cylindrical jacket 1, heat and pressurize the lining tube in the cylindrical jacket 1, and forms a lining layer 4 made of rubber or synthetic resin. This makes the jacket liquid-tight, and completes a jacket hose 5. The jacket hose 5 can be used as a fire hose, shape-keep hose, water absorption hose and oil supply hose.

In the jacket hose 5, the twill line A aligned with the central axis S of the cylindrical jacket 1 is formed linearly over the central axis direction of the cylindrical jacket 1, inside the cylindrical jacket 1. Therefore, the part of the lining layer 4 contacting the twill line A projects to the inside of the jacket hose 5, and a plurality of linear projected rims are formed along the longitudinal direction of the jacket hose 5 following the twill line A. The projected rims control generation of turbulence to flow inside, minimize a pressure loss, and increase water flow speed. Further, as linear projected rims 6 can be formed along the longitudinal direction of the jacket hose 5 without additionally processing the lining layer 4, the manufacturing cost can be remarkably decreased. Moreover, as the projected rims 6 are formed by the twill line A, the jacket hose 5 can be made flexible, lightweight and easy-to-handle.

In the above embodiment, a twist is given around the central axis S of the cylindrical jacket 1 woven into twill, and the direction of the twill line A is substantially aligned with the central axis of the cylindrical jacket 1. The twill line A generated obliquely to the central axis S of the cylindrical jacket 1 may be formed linearly along the central axis S of the cylindrical jacket 1, by arranging the warp 2 spirally to the central axis of the cylindrical jacket 1, when weaving.

A not-shown lining layer may be formed at least inside the cylindrical jacket 1 of the above embodiment, and the hose may be a suction hose in which the direction of twill line is substantially aligned with the axial line of the hose when a negative pressure is applied to the hose during use.

Three ½ twilled cloths are explained in the above embodiment. Four twills or other types of twill may be used. The number and thickness of the warp 2 can be changed appropriately according to the purposes of use.

Embodiment 2

Figure 7:
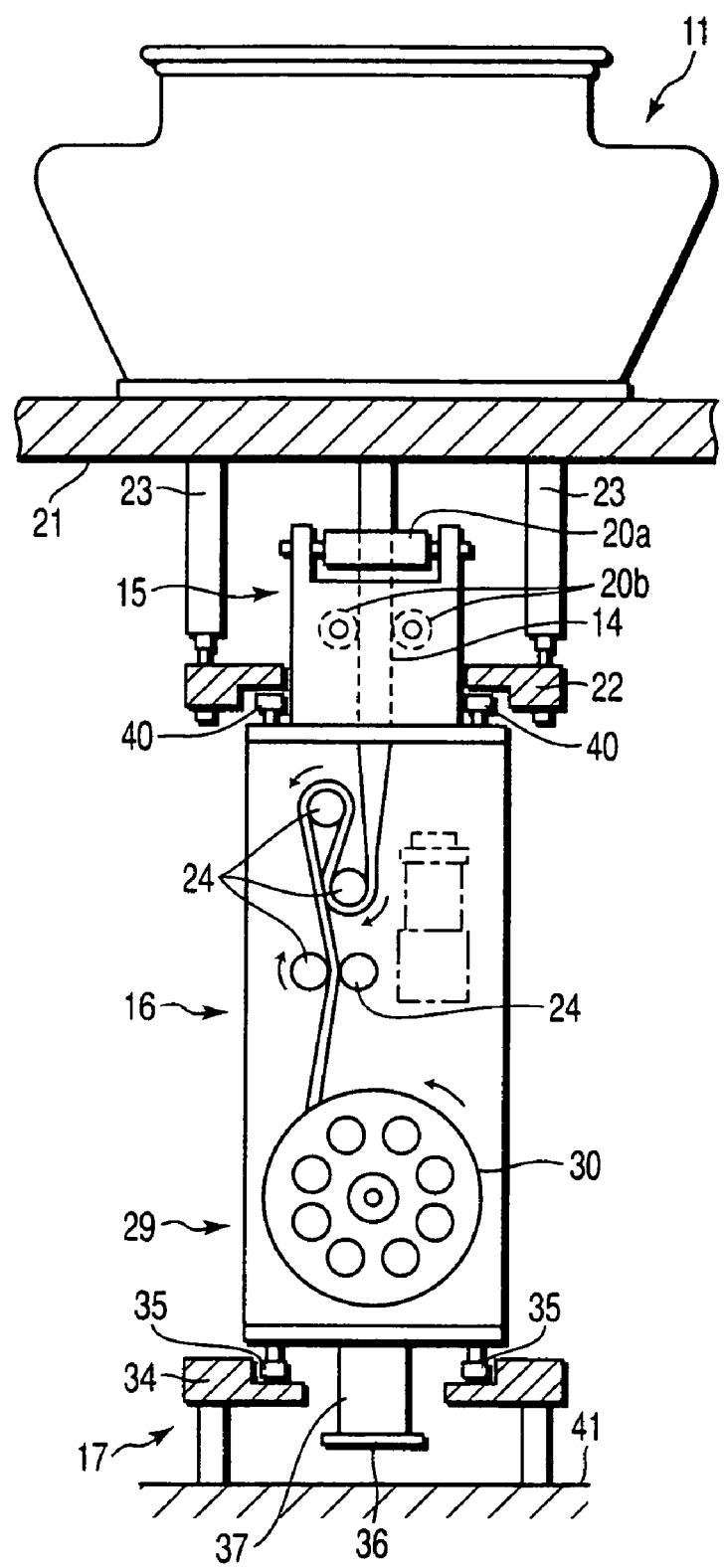
FIG. 7 is a left side view of the cylindrical jacket manufacturing apparatus.

A cylindrical jacket manufacturing apparatus will be explained with reference to FIGS. 6-9. FIG. 6 is a front view of the manufacturing apparatus, FIG. 7 is a left side view of FIG. 6, FIG. 8 is a right side view of FIG. 6, and FIG. 9 is a plane view of a lower part fixing guide, which is one of the components of the manufacturing apparatus of FIG. 6. An upper part fixing guide described later has the same form.

As shown in FIGS. 6-8, a cylindrical weaving machine 11 is placed at a position, as it were, the second floor. The cylindrical weaving machine 11 is the Mandal HM604, for example. The cylindrical weaving machine 11 has a shuttle (not shown) to weave a weft rotating around a weaving ring 12. The shuttle feeds a weft (not shown) to the inside of the weaving ring 12, which weaves a cylindrical jacket 14 with a warp 13 fed from the outside of the cylindrical weaving machine 11.

The above manufacturing apparatus has a cylinder twisting mechanism 15, a rotary take-in unit 16, and a rotating mechanism 17 to rotate the unit 16, sequentially from the ceiling side. The rotary take-in unit 16 is configured to rotate in synchronization with the revolution number of the shuttle of the cylindrical weaving machine 11 at an optional ratio. One end of a support rod 18 is held in the upper part of the cylindrical weaving machine 11. The other end of the support rod 18 is equipped with a cylinder holding mandrel 19 to protect the cylindrical jacket 14 from the cylindrical weaving machine 11. The cylindrical jacket 14 is moved outside the cylinder holding mandrel 19.

The above cylinder twisting mechanism 15 has a first pair of twisting rollers 20a to hold the mandrel 19 from the outside of the cylindrical jacket, and a second pair of twisting rollers 20b, in the upper and lower part, in addition to the cylinder holding mandrel 19. These twisting rollers 20a and 20b are arranged crossing with each other in a plane view. A ceiling 21 of the first floor is provided with a support member 23 to support the upper fixing guide 22.

The above rotary take-in unit 16 has a plurality of take-in roller 24 to feed the cylindrical jacket 14 from the cylindrical weaving machine 11 to a predetermined position, a driving source (motor) 25 to drive these take-in rollers 24, and one reduction gear 26 and two bevel gears 27 as a transmission mechanism to transmit the driving force of the motor 25 to the take-in rollers 24. The shaft of each take-in roller 24 is provided with a spur gear 28, which is used to transmit the driving force from the motor 25 to each take-in roller 24.

The above rotary take-in unit 16 has a take-up unit 29 to take up the jacket from the unit 16. The take-up unit 29 has a take-up reel 30 to take up the cylindrical jacket 14, a driving source (motor) 31 to drive the take-up reel 30, and a chain 32 as a transmission mechanism to transmit the driving force of the motor 31 to the take-up reel 30.

The above rotary take-in unit 16 and take-up unit 29 are configured to be rotated as one body by the rotating mechanism 17. The rotating mechanism 17 has four rotating rollers 40 which are provided between the upper part of the rotary take-in unit 16 and the upper part fixing guide 22, a rotating shaft 37 which is connected to the central part of the rotary take-in unit 16 along the axial direction of the unit and has a sprocket 36 as a transmitting tool at the lower end portion, a driving source (motor) 38 which drives the rotary take-in unit 16, and a chain 39 as a transmitting means for transmitting the driving force from the motor 38 to the sprocket 36.

Four rotating rollers 40 are provided between the upper part of the rotary take-in unit 16 and the upper part fixing guide 22. The upper part fixing guide 22 is supported by the ceiling 21, and a lower fixing guide 34 is supported by the floor 41. When the rotary take-in unit 16 is rotated by the rotating mechanism 17, rotating rollers 35 of the lower part side are rotated for the lower part fixing guide 34 and the rotating rollers 40 of the upper part side are rotated for the upper part fixing guide 22.

Four rotating rollers 35 are provided between the lower part of the rotary take-in unit 16 and the lower part fixing unit 34, as shown in FIG. 9. When the cylindrical jacket 14 is woven, the take-in roller 24 pulls the cylindrical jacket 14 by the strong force, and the upper rotating rollers 40 receive the rotary take-in unit 16. When the cylindrical jacket 14 is not woven, the lower rotating rollers 35 receive the rotary take-in unit 16.

In the cylindrical jacket manufacturing apparatus with the above-mentioned structure, the rotary take-in unit 16 is rotated by the rotating mechanism 17 in synchronization with the revolution number of the shuttle at an optional ratio, and the cylindrical jacket is woven by twisting a warp. Therefore, it is easy to manufacture a cylindrical jacket with a warp twisted, not straight. Particularly, since the cylinder twisting mechanism 15 having the cylinder twisting rollers 20a and 20b is provided between the ceiling 21 and rotary take-in unit 16, the cylindrical jacket 14 is not wrinkled even if a large twist is given, and the evenly twisted cylindrical jacket 14 can be obtained.

According to the above apparatus, when weaving a ½ twilled cloth, the direction of twill line formed by a warp woven continuously over a weft can be substantially aligned with the direction of the central axis of a cylindrical jacket, or can be made a little spiral to the central axis. Therefore, when a cylindrical jacket is used as a hose, a linear or little spiraled vertical stripe is generated inside, and a pressure loss of the hose including a curved portion can be decreased. The angle of a twill line to the central axis of jacket is primarily determined by the specifications of twill (texture, thickness and density of warp and weft). However, according to the present invention, the angle of a twill line can be freely set (0-10°) by twisting a warp at an optional angle to the central axis of jacket.

The present invention is not limited to the embodiments described hereinbefore. The invention may be embodied by varying the components in a practical state without departing from its spirit or essential characteristics. The invention may be modified by combining the components disclosed in the embodiments. For example, some components may be deleted from all components shown in the embodiments. The components of different embodiments may be combined.

What is claimed is:

1. A jacket hose which is formed by providing a lining layer on an inside surface of a cylindrical jacket comprising a warp and a weft which are woven into twill, wherein a direction of a twill line formed by the warp woven continuously over the weft is substantially aligned with a central axis of the hose, or forms an angle of less than 10° to the central axis of the hose, and portions of the lining layer that are brought into contact with the twill lines constitute linear projecting rims projecting towards the inside of the hose, the linear projecting rims being arranged at an angle of less than 10° to the central axis of the hose.

2. A jacket hose according to claim 1, wherein when a using pressure is applied to the hose, the direction of twill line is substantially aligned with the central axis of the hose, or forms an angle of 10° or less to the hose.

3. The jacket hose according to claim 1, wherein the warp is a fiber, and the weft is a fiber, a linear metallic material, a linear synthetic resin, or a combination of these materials.

4. A suction hose which is formed by providing a lining layer at least on an inside surface of a cylindrical jacket comprising a warp and a weft which are woven into twill, wherein a direction of a twill line formed by the warp woven continuously over the weft is substantially aligned with a central axis of the hose, or forms an angle of 10° to the central axis of the hose, and portions of the lining layer that are brought into contact with the twill lines constitute linear projecting rims projecting towards the inside of the hose, the linear projecting rims being arranged at an angle of less than 10° to the central axis of the hose.

5. A suction hose according to claim 4, wherein when a negative pressure is applied to the hose when using, the direction of twill line is substantially aligned with the central axis of the hose, or forms an angle of 10° or less to the hose.

6. The suction hose according to claim 4, wherein the warp is a fiber, and the weft is a fiber, a linear metallic material, a linear synthetic resin, or a combination of these materials.

* * * * *